US008605685B2

(12) United States Patent
Song et al.

(10) Patent No.: US 8,605,685 B2
(45) Date of Patent: Dec. 10, 2013

(54) DETERMINING UE INTERFERENCE DURING HANDOVER IN ENHANCED INTER-CELL INTERFERENCE COORDINATION

(75) Inventors: Osok Song, San Diego, CA (US); Rajat Prakash, La Jolla, CA (US); Ajay Gupta, San Diego, CA (US); Tingfang Ji, San Diego, CA (US); Masato Kitazoe, Tokyo (JP)

(73) Assignee: Qualcomm Incorporated, San Diego, CA (US)

( * ) Notice: Subject to any disclaimer, the term of this patent is extended or adjusted under 35 U.S.C. 154(b) by 49 days.

(21) Appl. No.: 13/462,739

(22) Filed: May 2, 2012

(65) Prior Publication Data
US 2012/0307808 A1  Dec. 6, 2012

Related U.S. Application Data

(60) Provisional application No. 61/483,023, filed on May 5, 2011.

(51) Int. Cl.
*H04W 4/00* (2009.01)
*H04W 36/00* (2009.01)

(52) U.S. Cl.
USPC .......................................... 370/332; 455/436

(58) Field of Classification Search
None
See application file for complete search history.

(56) References Cited

U.S. PATENT DOCUMENTS

| 2008/0232326 | A1 | 9/2008 | Lindoff et al. | |
|---|---|---|---|---|
| 2010/0035615 | A1 | 2/2010 | Kitazoe et al. | |
| 2011/0105135 | A1 | 5/2011 | Krishnamurthy et al. | |
| 2011/0170424 | A1 | 7/2011 | Safavi | |
| 2011/0188472 | A1 | 8/2011 | Jeon et al. | |
| 2011/0243047 | A1* | 10/2011 | Dayal et al. | 370/311 |
| 2011/0256834 | A1* | 10/2011 | Dayal et al. | 455/67.7 |
| 2012/0020229 | A1* | 1/2012 | Dayal et al. | 370/252 |
| 2012/0069756 | A1* | 3/2012 | Ji et al. | 370/252 |
| 2012/0190365 | A1* | 7/2012 | Jeong et al. | 455/436 |
| 2012/0252460 | A1* | 10/2012 | Koskinen et al. | 455/438 |

FOREIGN PATENT DOCUMENTS

| WO | WO 2011028158 A1 | 3/2011 |
|---|---|---|
| WO | WO 2012006085 | 1/2012 |

OTHER PUBLICATIONS

International Search Report and Written Opinion—PCT/US2012/036365—ISA/EPO—Jun. 21, 2012.
Rahman M., "Dynamic Inter-Cell Interference Coordination in Cellular OFDMA Networks", Department of system and computer engineering, Queens University, Jul. 2011, pp. 1-117.

(Continued)

*Primary Examiner* — Clemence Han
(74) *Attorney, Agent, or Firm* — Seyfarth Shaw LLP

(57) ABSTRACT

A method of wireless communication determines a UE interference condition during handover. A target cell receives information that indicates an interference condition of a user equipment (UE). Prior to completing handover, the target cell determines an expected UE interference condition that will arise after completing the handover of the UE at a target base station. The information can be determined based on a message from the UE. The UE message may indicate which cell is the strongest, indicate the interference condition at both the source and target cells, or only provide a measurement of the strongest cell. Based on the UE measurements, the target eNodeB may schedule the UE on resources based on the expected interference condition at the UE that may arise after the handover.

25 Claims, 15 Drawing Sheets

(56) References Cited

OTHER PUBLICATIONS

Renesas Electronics Europe: "Discussion on CSI measurements over restricted subframes for eICIC in relation to the RAN1 LS",3GPP Draft; R4-110934.

3rd Generation Partnershi P Project (3GPP), Mobile Competence Centre ; 650, Route Deslucioles ; F-06921 Sophia-Antipoliscedex; France,vol . RAN WG4, no. Taipei , Taiwan; Feb. 16, 2011 , XP050500991, [retrieved on Feb. 16, 2011) the whole document.

* cited by examiner

DETERMINING UE INTERFERENCE DURING HANDOVER IN ENHANCED INTER-CELL INTERFERENCE COORDINATION

CROSS-REFERENCE TO RELATED APPLICATION

This application claims the benefit under 35 U.S.C. §119(e) to U.S. Provisional Patent Application No. 61/483,023 entitled "DETERMINING UE INTERFERENCE DURING HANDOVER IN ENHANCED INTER-CELL INTERFERENCE COORDINATION," filed on May 5, 2011, the disclosure of which is expressly incorporated by reference herein in its entirety.

BACKGROUND

1. Field

Aspects of the present disclosure relate generally to wireless communication systems, and more particularly to determining and mitigating interference conditions during a handover.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

A method of wireless communication determines a UE interference condition during handover. A target cell receives information that indicates an interference condition of a user equipment (UE). Prior to completing handover, the target cell determines an expected UE interference condition that will arise after completing the handover of the UE at a target base station. The information can be determined based on a message from the UE. The UE message explicitly indicates which cell is the strongest, indicates the interference condition at both the source and target cells or only provides a measurement of the strongest cell.

In one aspect of the present disclosure, a method of wireless communication is disclosed. The method includes receiving information that indicates an interference condition of a user equipment (UE) in a network that supports an inter-cell interference coordination (ICIC) scheme. Prior to completing a handover, a UE interference condition expected after completing the handover to a target base station is determined.

Another aspect discloses an apparatus including means for receiving information. The received information indicates an interference condition of a user equipment (UE) in a network that supports an inter-cell interference coordination scheme. Also included is means for determining, prior to completing a handover, a UE interference condition expected after completing the handover of the UE to a target base station.

In another aspect, a computer program product for wireless communications in a wireless network having a non-transitory computer-readable medium is disclosed. The computer readable medium has non-transitory program code recorded thereon, which when executed by the processor(s), causes the processor(s) to receive information indicating an interference condition of a user equipment (UE) in a network that supports an inter-cell interference coordination scheme. The program code also causes the processor(s) to determine, prior to completing a handover, a UE interference condition expected after completing the handover of the UE to a target base station.

Another aspect discloses wireless communication having a memory and at least one processor coupled to the memory. The processor(s) is configured to receive information indicating an interference condition of a user equipment (UE) in a network that supports inter-cell interference coordination. The processor(s) is also configured to determine, prior to completing a handover, a UE interference condition expected after completing the handover of the UE to a target base station.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
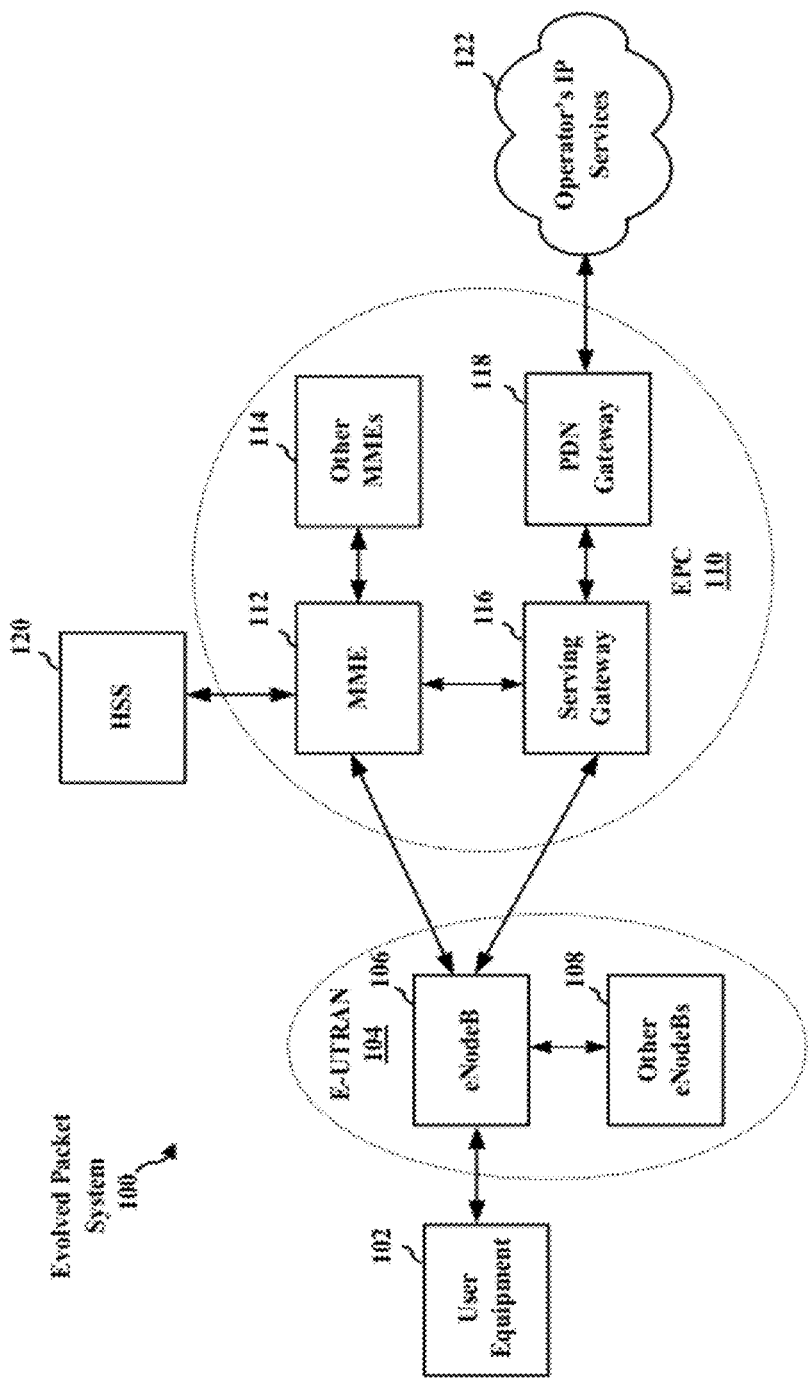
FIG. 1 is a diagram illustrating an example of a network architecture.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Aspects of the telecommunication systems are presented with reference to various apparatus and methods. These apparatus and methods are described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The network architecture 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNodeB) 106 and other eNodeBs 108. The eNodeB 106 provides user and control plane protocol terminations toward the UE 102. The eNodeB 106 may be connected to the other eNodeBs 108 via a backhaul (e.g., an X2 interface). The eNodeB 106 may also be referred to as a base station, a base transceiver station, a radio base station, a radio transceiver, a transceiver function, a basic service set (BSS), an extended service set (ESS), or some other suitable terminology. The eNodeB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNodeB 106 is connected to the EPC 110 via, e.g., an S1 interface. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
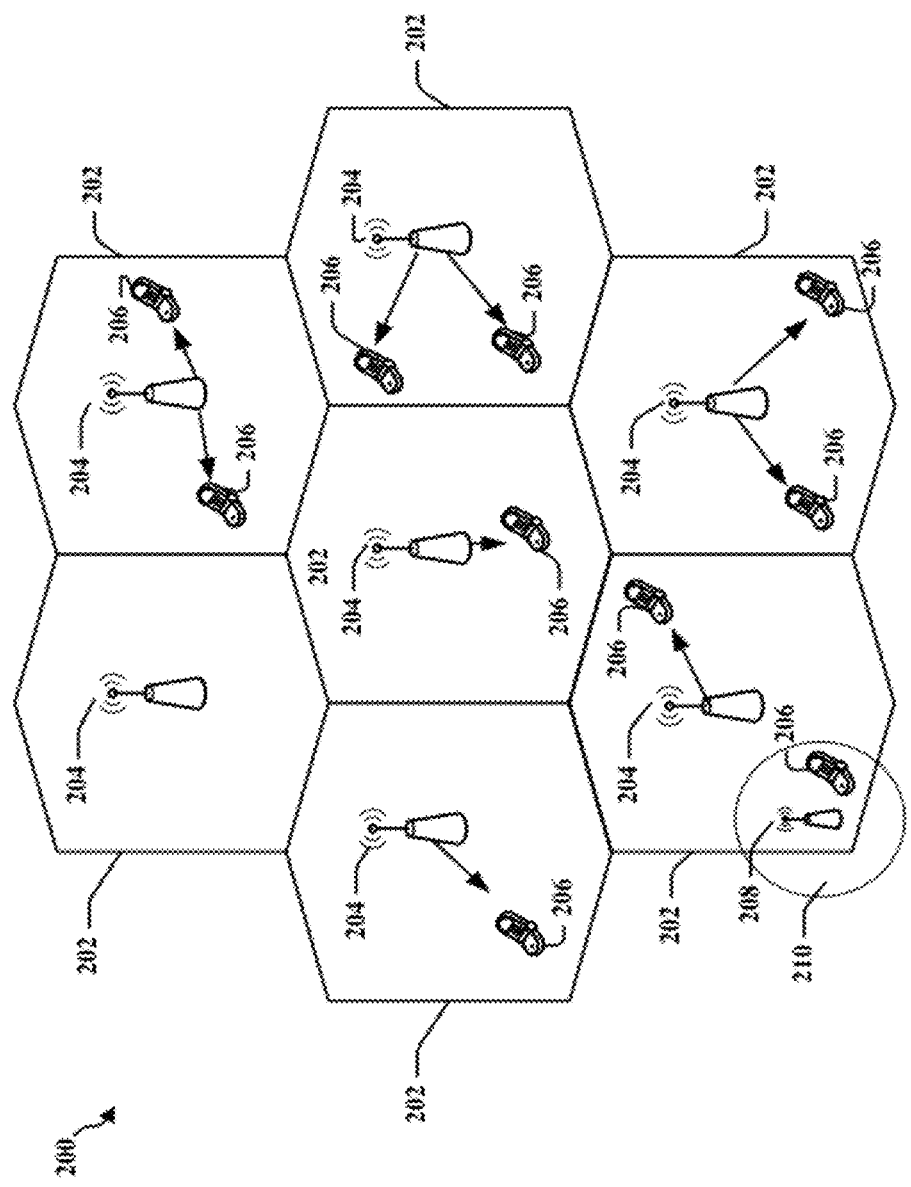
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNodeBs 208 may have cellular regions 210 that overlap with one or more of the cells 202. The lower power class eNodeB 208 may be a remote radio head (RRH), a femto cell (e.g., home eNodeB (HeNodeB)), pico cell, or micro cell. The macro eNodeBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNodeBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the downlink and SC-FDMA is used on the uplink to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNodeBs 204 may have multiple antennas supporting MIMO technology. The use of MIMO technology enables the eNodeBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the downlink. The spatially precoded data streams arrive at the UE(s) 206 with different spatial signatures, which enables each of the UE(s) 206 to recover the one or more data streams destined for that UE 206. On the uplink, each UE 206 transmits a spatially precoded data stream, which enables the eNodeB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PAPR).

Figure 3:
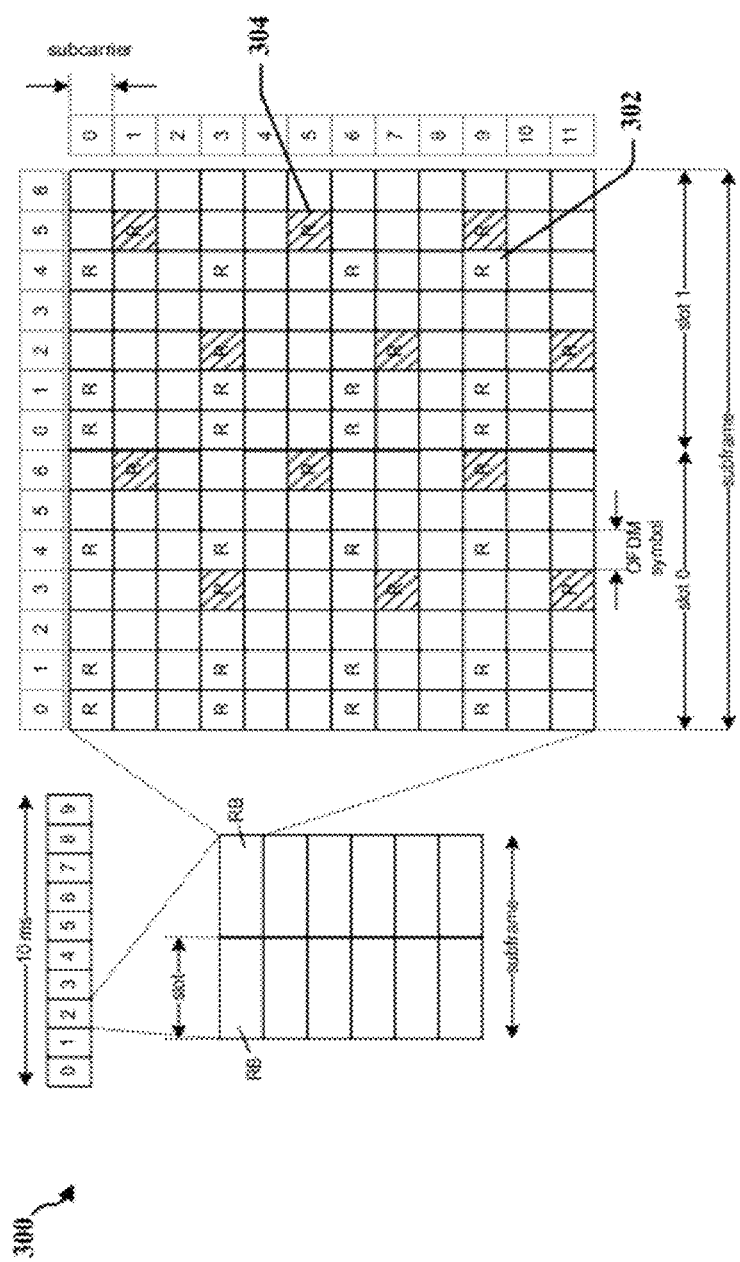
FIG. 3 is a diagram illustrating an example of a downlink frame structure in LTE.

FIG. 3 is a diagram 300 illustrating an example of a downlink frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include downlink reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical downlink shared channel (PDSCH) is mapped. The number of bits carried by each resource element depends on the modulation scheme. Thus, the more resource blocks that a UE receives and the higher the modulation scheme, the higher the data rate for the UE.

Figure 4:
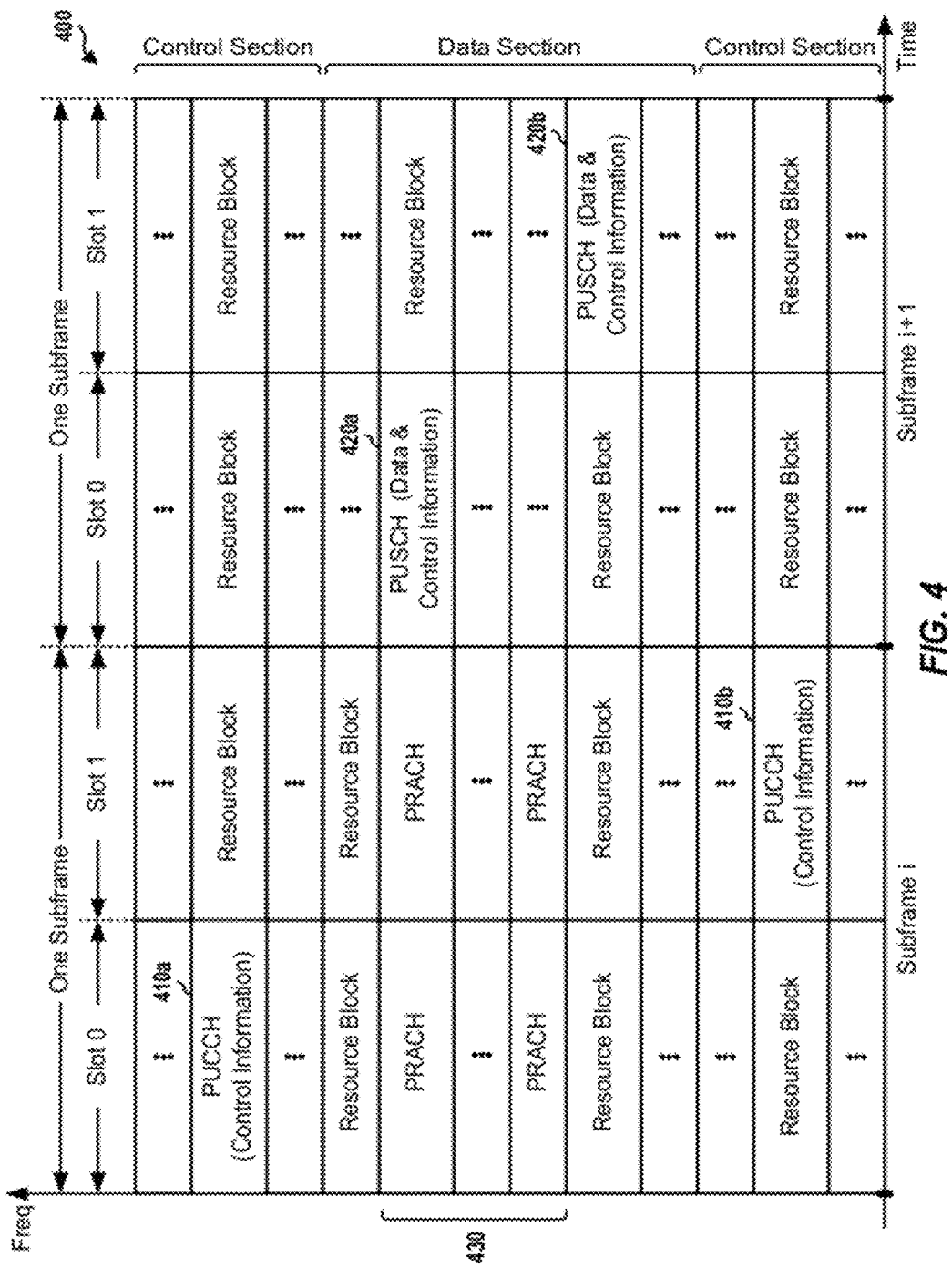
FIG. 4 is a diagram illustrating an example of an uplink frame structure in LTE.

FIG. 4 is a diagram 400 illustrating an example of an uplink frame structure in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The uplink frame structure results in the data section including contiguous subcarriers, which may allow a single UE to be assigned all of the contiguous subcarriers in the data section.

A UE may be assigned resource blocks 410a, 410b in the control section to transmit control information to an eNodeB. The UE may also be assigned resource blocks 420a, 420b in the data section to transmit data to the eNodeB. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. A uplink transmission may span both slots of a subframe and may hop across frequency.

A set of resource blocks may be used to perform initial system access and achieve uplink synchronization in a physical random access channel (PRACH) 430. The PRACH 430 carries a random sequence and cannot carry any uplink data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
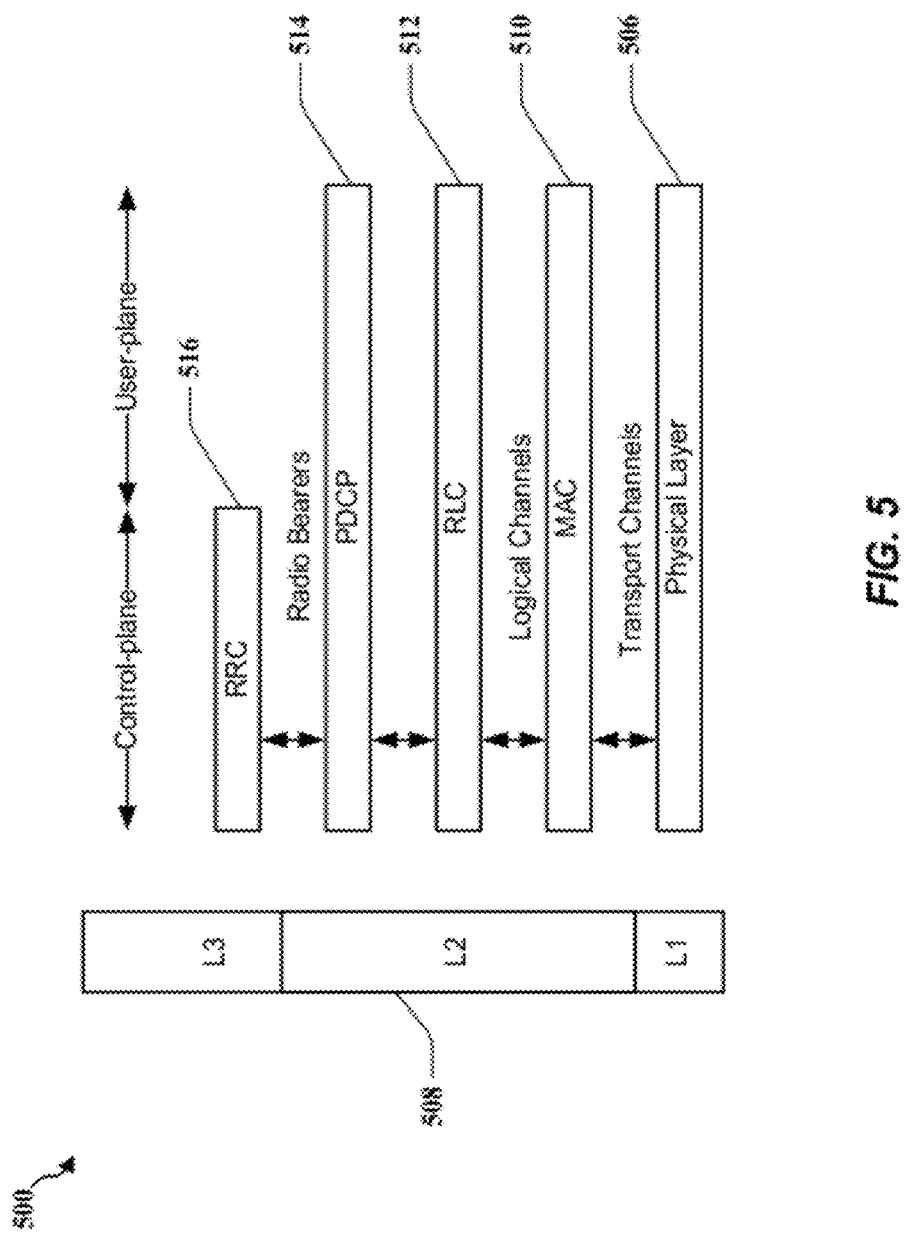
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNodeB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNodeB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNodeB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNodeBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNodeB is substantially the same for the physical layer 506 and the L2 layer 508 with the exception that there is no header compression function for the control plane. The control plane also includes a radio resource control (RRC) sublayer 516 in Layer 3(L3 layer). The RRC sublayer 516 is responsible for obtaining radio resources (i.e., radio bearers) and for configuring the lower layers using RRC signaling between the eNodeB and the UE.

Figure 6:
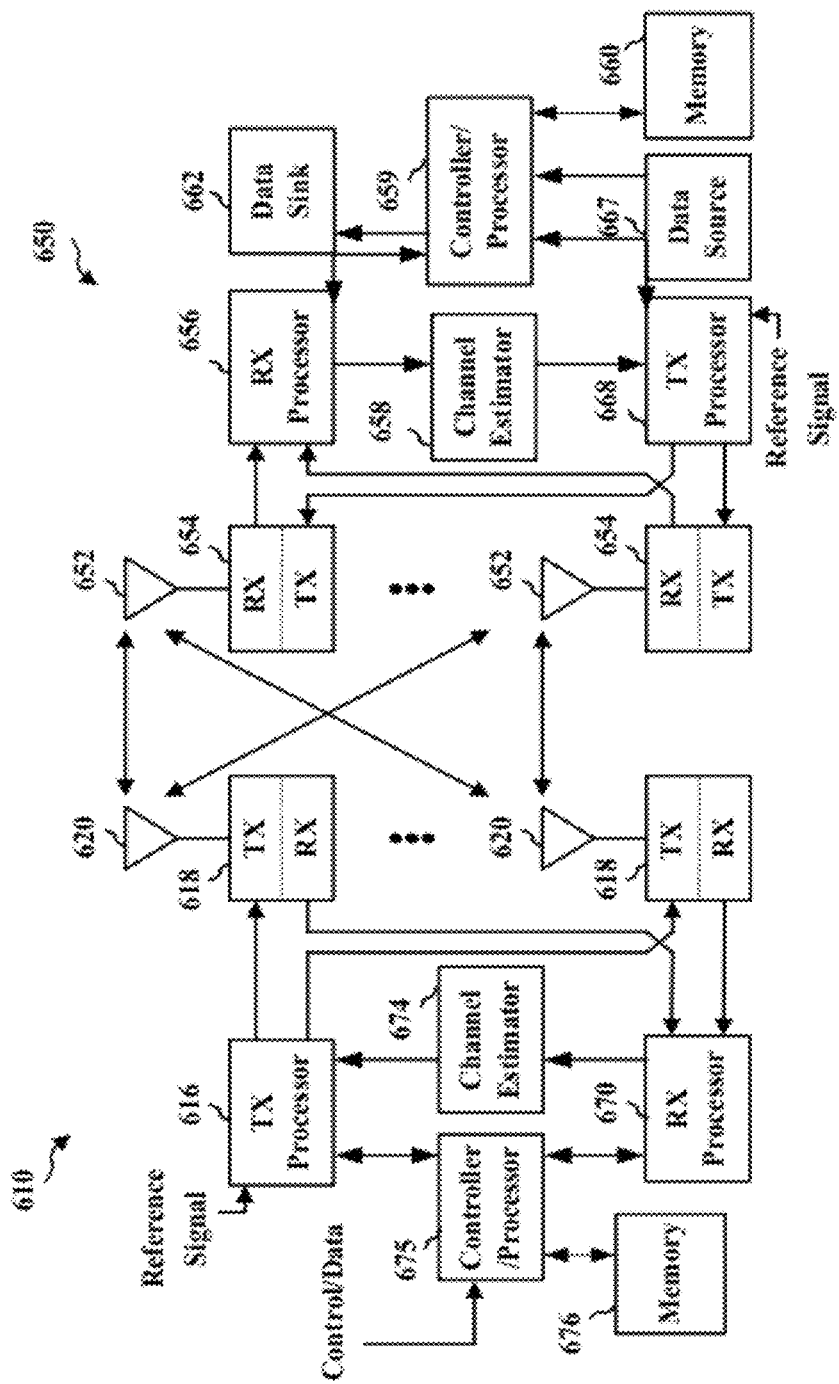
FIG. 6 is a diagram illustrating an example of an evolved Node B and user equipment in an access network.

FIG. 6 is a block diagram of an eNodeB 610 in communication with a UE 650 in an access network. In the downlink, upper layer packets from the core network are provided to a controller/processor 675. The controller/processor 675 implements the functionality of the L2 layer. In the downlink, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618 TX. Each transmitter 618 TX modulates an RF carrier with a respective spatial stream for transmission.

At the UE 650, each receiver (RX) 654 receives a signal through its respective antenna 652. Each receiver 654 recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNodeB 610. These soft decisions may be based on channel estimates computed by the channel estimator 658. The soft decisions are then decoded and deinterleaved to recover the data and control signals that were originally transmitted by the eNodeB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the uplink, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the uplink, a data source 667 is used to provide upper layer packets to the controller/processor 659. The data source 667 represents all protocol layers above the L2 layer. Similar to the functionality described in connection with the downlink transmission by the eNodeB 610, the controller/processor 659 implements the L2 layer for the user plane and the control plane by providing header compression, ciphering, packet segmentation and reordering, and multiplexing between logical and transport channels based on radio resource allocations by the eNodeB 610. The controller/processor 659 is also responsible for HARQ operations, retransmission of lost packets, and signaling to the eNodeB 610.

Channel estimates derived by a channel estimator 658 from a reference signal or feedback transmitted by the eNodeB 610 may be used by the transmitter (TX) processor 668 to select the appropriate coding and modulation schemes, and to facilitate spatial processing. The spatial streams generated by the TX processor 668 are provided to different antenna 652 via separate transmitters 654 TX. Each transmitter 654 TX modulates an RF carrier with a respective spatial stream for transmission.

The uplink transmission is processed at the eNodeB 610 in a manner similar to that described in connection with the receiver function at the UE 650. Each receiver 618 RX receives a signal through its respective antenna 620. Each receiver 618 RX recovers information modulated onto an RF carrier and provides the information to a RX processor 670. The RX processor 670 may implement the L1 layer.

Figure 7:
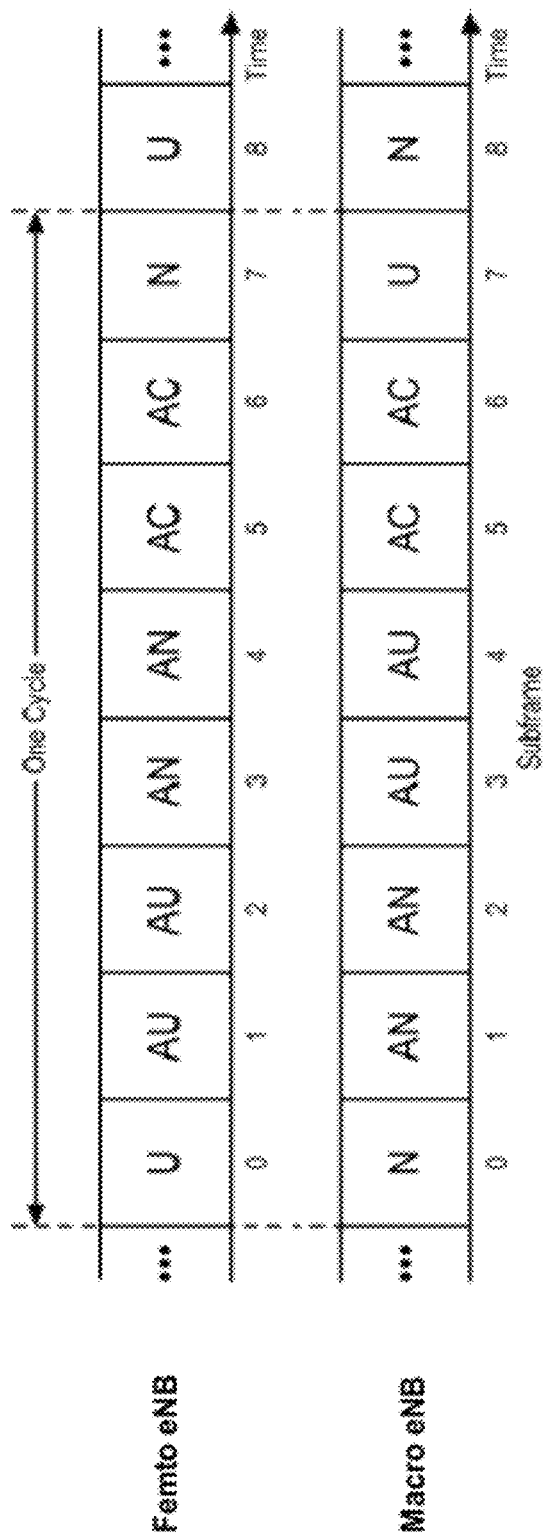
FIG. 7 is a block diagram conceptually illustrating adaptive resource partitioning in a heterogeneous network according to one aspect of the disclosure.

The controller/processor 675 implements the L2 layer. The controller/processor 675 can be associated with a memory 676 that stores program codes and data. The memory 676 may be referred to as a computer-readable medium. In the uplink, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations FIG. 7 is a block diagram illustrating TDM partitioning in a heterogeneous network according to one aspect of the disclosure. A first row of blocks illustrate sub frame assignments for a femto eNodeB, and a second row of blocks illustrate sub frame assignments for a macro eNodeB. Each of the eNodeBs has a static protected sub frame during which the other eNodeB has a static prohibited sub frame. For example, the femto eNodeB has a protected sub frame (U sub frame) in sub frame 0 corresponding to a prohibited sub frame (N sub frame) in sub frame 0. Likewise, the macro eNodeB has a protected sub frame (U sub frame) in sub frame 7 corresponding to a prohibited sub frame (N sub frame) in sub frame 7. Sub frames 1-6 are dynamically assigned as either protected sub frames (AU), prohibited sub frames (AN), and common sub frames (AC). The dynamically assigned subframes (AU/AN/AC) are referred to herein collectively as "X" subframes. During the dynamically assigned common sub frames (AC) in sub frames 5 and 6, both the femto eNodeB and the macro eNodeB may transmit data. The static subframes (U/N) described above could be included in almost-blank-subframe (ABS) patterns signaled to the UE via RRC signaling for serving cell and neighbor cell restricted measurements. The dynamically assigned subframes could correspond to actual scheduling patterns.

Protected sub frames (such as U/AU sub frames) have reduced interference and a high channel quality because aggressor eNodeBs are prohibited from transmitting. Prohibited sub frames (such as N/AN sub frames) have no data transmission to allow victim eNodeBs to transmit data with low interference levels. Common sub frames (such as C/AC sub frames) have a channel quality dependent on the number of neighbor eNodeBs transmitting data. For example, if neighbor eNodeBs are transmitting data on the common sub frames, the channel quality of the common sub frames may be lower than the protected sub frames. Channel quality on common sub frames may also be lower for cell range expansion (CRE) UEs strongly affected by aggressor eNodeBs. An CRE UE may belong to a first eNodeB but also be located in the coverage area of a second eNodeB. For example, a UE communicating with a macro eNodeB that is near the range limit of a femto eNodeB coverage is an CRE UE.

One aspect of the present disclosure is directed to a network that supports interference coordination, where, the base stations negotiate with each other to coordinate resources to reduce or eliminate interference. For example, in LTE networks this interference coordination scheme could be either inter-cell interference coordination (ICIC) or enhanced inter-cell interference coordination (eICIC) scheme. In one example, an interfering base station may yield specific resources to reduce or eliminate interference. Thus, a UE can access a serving base station even with severe interference by using the resources yielded by the interfering base station.

Figure 8:
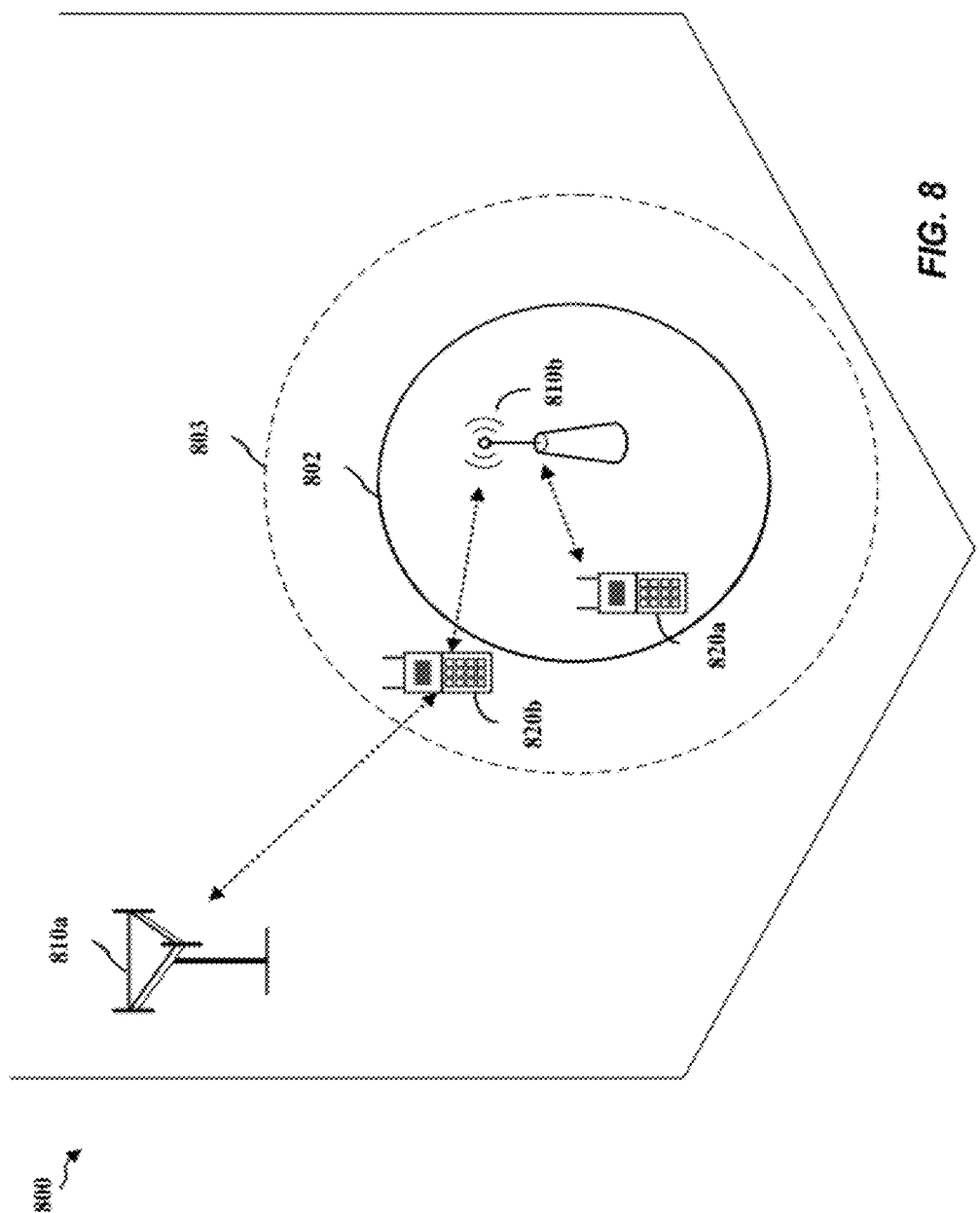
FIG. 8 is a diagram illustrating a range expanded cellular region in a heterogeneous network.

FIG. 8 is a diagram illustrating a CRE region in a heterogeneous network 800 that supports enhanced inter-cell interference coordination. A lower power class eNodeB, such as the remote radio head (RRH) 810b, may have a CRE region 803 that is expanded from the cellular region 802 through enhanced inter-cell interference coordination between the RRH 810b and a macro eNodeB 810a and through interference cancelation performed by the UE 820a, 820b. In enhanced inter-cell interference coordination, the RRH 810b receives information from the macro eNodeB 810a about an interference condition of the UE 820a/b. The information allows the RRH 810b to serve the UE 820b in the CRE region 803 and to accept a handoff of the UE 820b from the macro eNodeB 810a as the UE 820 enters the CRE region 803.

Two types of handover may occur in a network 800 supporting enhanced inter-cell interference coordination. The first type of handover, from the UE perspective, is a handover of a UE from a weaker to a stronger cell. The second type of handover is a handover from a stronger cell to a weaker cell.

In a typical release 8/9 handover, a handover of a UE 820a is triggered when the target eNodeB 810b is stronger than the source eNodeB 810a. This corresponds to the first type of handover, where the UE 820a is within the perimeter of the target eNodeB's strong coverage area 802 during handover.

In a handover of a UE 820b to the CRE 803 of the target eNodeB 810b, the UE 820b is handed over from the stronger eNodeB 810a, such as a macro cell, to a weaker eNodeB 810b, such as a pico cell (or RRH) with CRE. This corresponds to the second type of handover.

In a radio access system using OFDM, the resources yielded by the interfering base station may be time-based, frequency based, or a combination thereof. In one example, the interfering base station does not utilize specific subframes in the time domain when the yielded resources are time based.

In another example, the interfering base station does not utilize specific subcarriers in the frequency domain when the yielded resources are frequency based. In yet another example, the interfering cell does not utilize the resources defined by frequency and time when the yielded resources are a combination of both frequency and time.

The resources that become available via enhanced inter-cell interference coordination allow the UE to be served by the weaker eNodeB. In one aspect, the target eNodeB receives information from the source eNodeB. The target eNodeB may properly handle the UE based on interference conditions indicated in the received information. For example, the eNodeB may schedule the UE with interference-protected resources if the UE is handed over due to CRE, as illustrated in FIG. 8. It should be noted that the term eNodeB is used as an example and the solutions of the present disclosure are not limited to an eNodeB.

Figure 9:
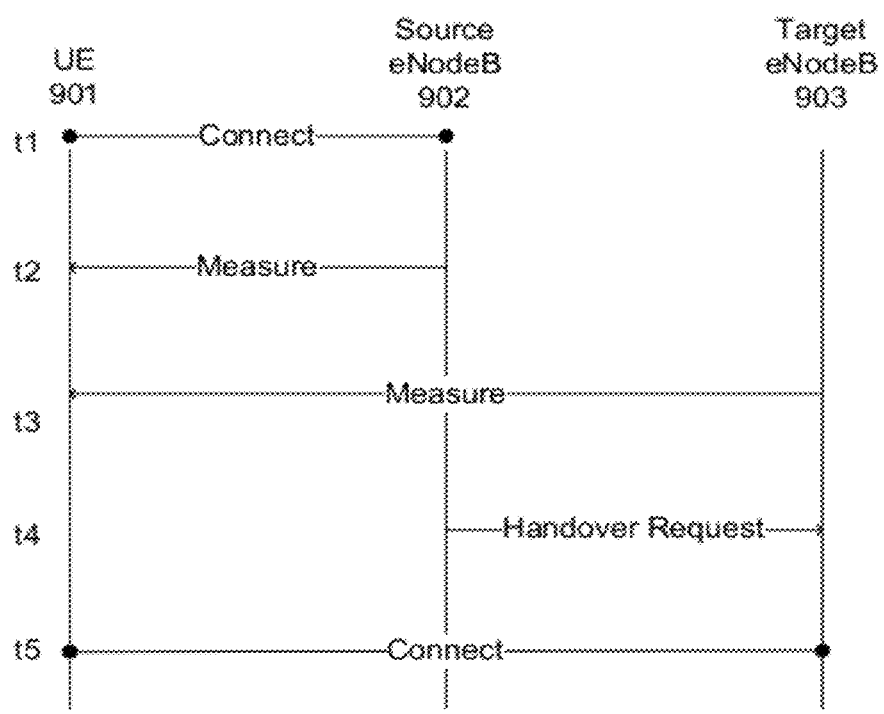
FIG. 9 is a call flow diagram illustrating handover in accordance with an aspect of the present disclosure.

As illustrated in FIG. 9, a UE 901 communicates with a source eNodeB 902 at time t1. The UE 901 measures the signal from the source eNodeB 902 at time t2 when it is determined that a handoff from the source eNodeB 902 to the target eNodeB 903 is to occur. At time t3, the UE 901 measures the signal of the target eNodeB 903. It is noted that time t2 and t3 are interchangeable. Furthermore, the UE may measure signals from multiple detectable eNBs, including the serving and target eNBs.

Figure 10:
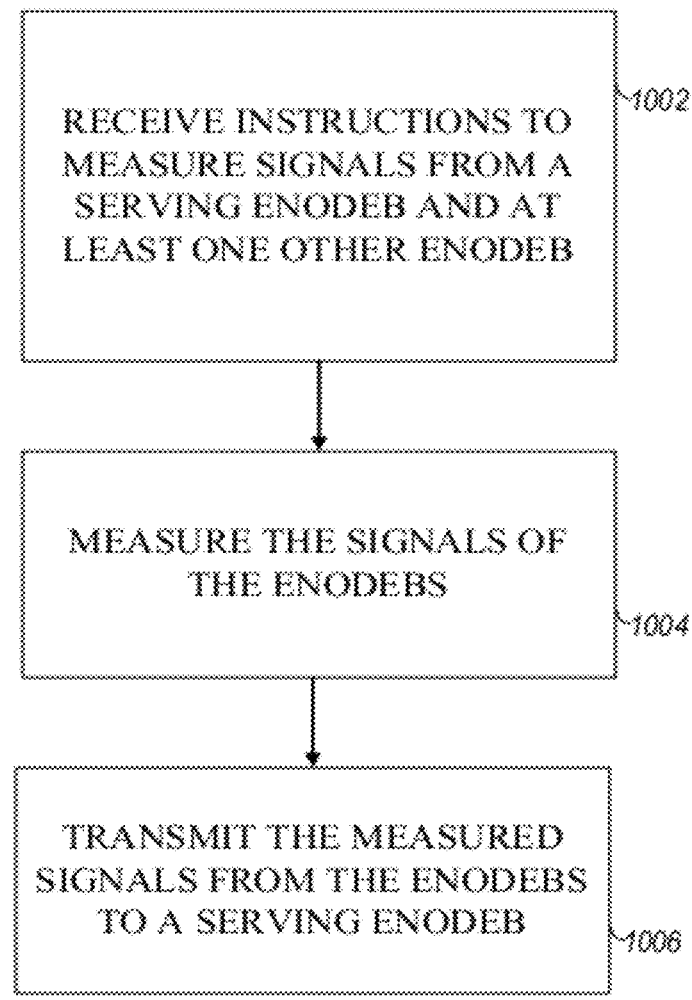
FIG. 10 is a block diagram illustrating a method for measuring signals and transmitting the measurements according to an aspect of the present disclosure.

FIG. 10 illustrates a method for measuring signals and transmitting the measurements.

As illustrated in FIG. 10, at block 1002, a UE may receive instructions to measure signals from a serving eNodeB and at least one other eNodeB. The at least one other eNodeB may include the target eNodeB.

At block 1004, the UE measures the signals of the eNodeBs.

Finally, at block 1006 the UE transmits the measured signals from the eNodeBs to a serving eNodeB. The UE may transmit the strongest of the measured signals, or all of the measured signals.

As illustrated in FIG. 9, according to one aspect, the target eNodeB 903 receives a handover request message from the source eNodeB 902 at time t4. The received handover request message may include signal measurements corresponding to UE signal measurements of a source eNodeB, a neighboring eNodeB, and/or a target eNodeB. The target eNodeB may identify the strongest eNodeB, such as the source eNodeB, the neighboring eNodeB, or the target eNodeB. Alternatively, the measurement results may be provided by the source eNodeB. Furthermore, the target eNodeB may determine an expected post-handover UE interference conditions based on the measurement results. For example, the target eNodeB may determine that the UE will be under strong interference after the handover is completed. This may be the case when the measurements indicate that the target eNodeB will not be the strongest eNodeB at the UE's location. For example, the signal from the source eNodeB, (and not the signal from the target eNodeB), may be the strongest eNodeB signal at the UE's location. According to one aspect, existing information elements in the existing handover messaging may convey the measured interference information. For example, in the handover preparation message to the target cell, the source eNodeB can include a candidate cell information list that indicates the best cells on each frequency for which measurement information was available, in order of decreasing .reference signal received power (RSRP) and/or reference signal received quality (RSRQ). According to another aspect, a new information element may be added to the handover messaging to convey the measured interference information.

In yet another example, the target eNodeB 903 receives a handover request message from the source eNodeB 902 at time t4 that includes an explicit indication that the handover is towards a weaker eNodeB. This indication informs the target eNodeB when it is the weaker eNodeB.

After the handover message is received, the UE 901 is handed over to the target eNodeB 903 at time t5. Prior to the handover, during the handover, or immediately after completing the handover, the target eNodeB 903 and the source eNodeB 902 negotiate to coordinate resources. For example, the source eNodeB 902 may yield resources when the source eNodeB is the stronger eNodeB so that the UE 901 can access the target eNodeB 903 using the yielded resources. For example, the resources of the target eNodeB 903 may be scheduled for the UE 901 based on the expected UE interference condition. This procedure allows resources to be allocated to the UE initially after a handover based on the expected post-handover interference conditions that the UE may experience. Furthermore, transmissions between the target eNodeB 903 and the UE 901 are initiated in accordance with the scheduled target base station resources.

Figure 11A:
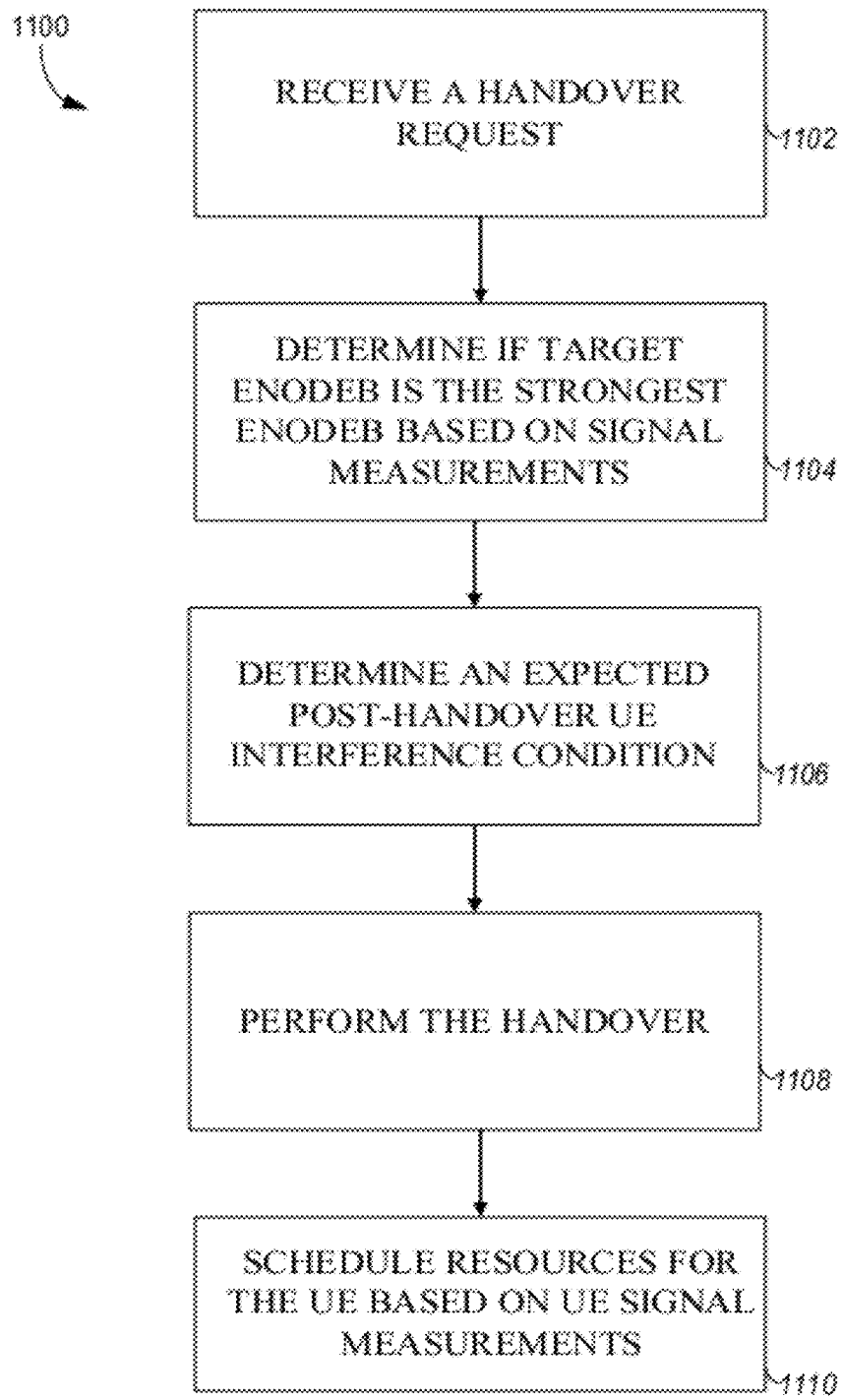
FIGS. 11A and 11B are block diagrams illustrating methods for performing a handover according to aspects of the present disclosure.

FIG. 11A illustrates a method 1100 for performing a handover according to an aspect of the present disclosure.

As illustrated in FIG. 11A, at block 1102 a target eNodeB will receive a handover request.

At block 1104, the target eNodeB may identify the strongest eNodeB based on signal measurements of a source eNodeB, neighboring eNodeB, and/or target eNodeB. The strongest eNodeB can be expressly identified in the handover message. For example, in the handover preparation message to the target cell, the source eNodeB can include a candidate cell information list that indicates the best cells on each frequency for which measurement information was available, in order of decreasing .reference signal received power (RSRP) and/or reference signal received quality (RSRQ). Alternatively, the target eNodeB can receive measurements of both eNodeBs or just a measurement of the strongest eNodeB in order to identify the strongest eNodeB. These measurements may be part of the handover request, or otherwise signaled in some other manner. In yet another alternative, the target eNodeB can receive just an indication of the type of handover being performed (e.g., a handover of a UE from a weak cell to a stronger cell, or a handover of a UE from a strong cell to a weaker cell).

The target eNodeB may then determine an expected post-handover UE interference condition, at block 1106. For example, the target eNodeB may determine that the UE will be under strong interference after the handover is completed. This may be the case when the measurements indicate that the target eNodeB will not be the strongest eNodeB at the UE's location. In another example, the target eNodeB determines the UE, post-handover, will not be under strong interference when the target eNodeB is the strongest eNodeB at the UE's location.

The target eNodeB then performs the handover, at block 1108.

Finally, at block 1110, the target eNodeB schedules resources for the UE based on UE signal measurements. This procedure allows resources to be allocated to the UE initially after a handover based on the expected post-handover interference conditions that the UE may experience. The resources of the target eNodeB 903 may be scheduled for the UE 901 based on the expected UE interference condition. For example, if the UE 901 is expected to experience strong interference after the handover, the target eNodeB 903 may schedule the UE 901 based on the pre-existing resource partitioning scheme between the source eNodeB 902 and the target eNodeB 903. That is, the eNodeB 903 may place the UE 901 on resources yielded by the source eNodeB 902, or stronger interferer to reduce interference for the UE 901. Alternatively, the target eNodeB 903 may schedule the UE 901 on resources already experiencing low interference, not yielded by the source eNodeB 902. It should be noted that the resource scheduling of block 1110 may be performed prior to, during, or immediately after completing the handover of block 1108.

In another aspect, the target eNodeB 903 receives a handover request message from the source eNodeB 902 at time t4 when the source eNodeB 902 sends the measurement results of both the target eNodeB 903 and the source eNodeB 902. The target eNodeB 903 evaluates the received measurements and determines the strongest eNodeB. In this example, the target eNodeB may determine that the UE will be under strong interference post-handover when the measurements of the source eNodeB are stronger than the measurements of the target eNodeB.

Figure 11B:
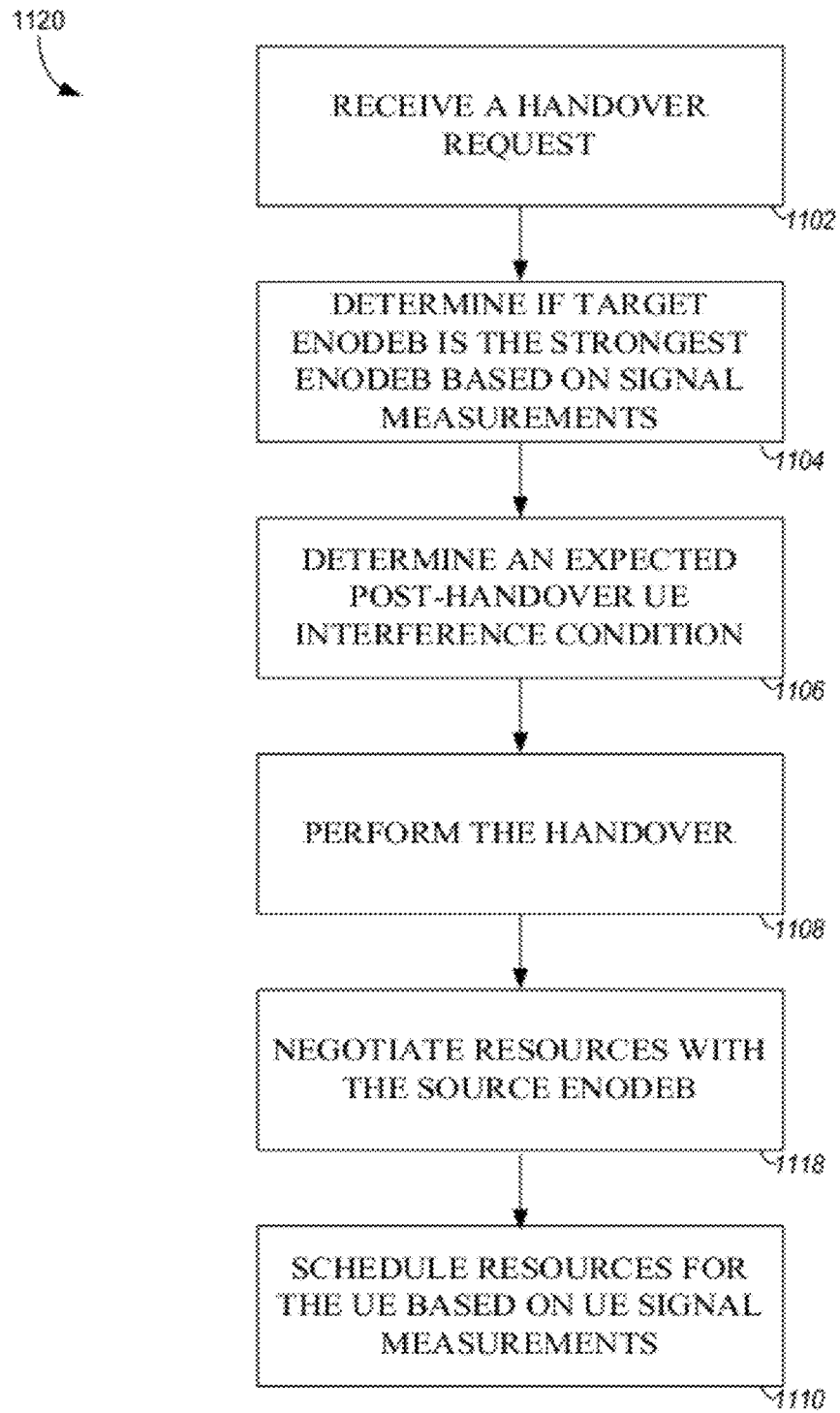

FIG. 11B illustrates an alternative method 1120 for performing a handover according to an aspect of the present disclosure. The method 1120 includes the blocks of method 1100, with the addition of block 1118.

In the method 1120, immediately following the handover (at block 1108,) the target eNodeB negotiates or coordinates resources with the source eNodeB (e.g., stronger eNodeB) at block 1118 to reduce interference to the UE. For example, the source eNodeB 902 and target eNodeB 903 may negotiate a new subframe or subband partitioning scheme based, at least in part, on the expected interference condition of UE 901 after handover (as well as other conditions, such as eNodeB loads and bandwidth availability). In this example, the source eNodeB 902 may yield resources when the source eNodeB 902 is the stronger eNodeB, so that the UE 901 can access the target eNodeB 903 using the yielded resources. The negotiation of resources may also be performed prior to the handover or during the handover of block 1108. After block 1118, the target eNodeB 903 schedules resources for the UE at block 1110.

Figure 12:
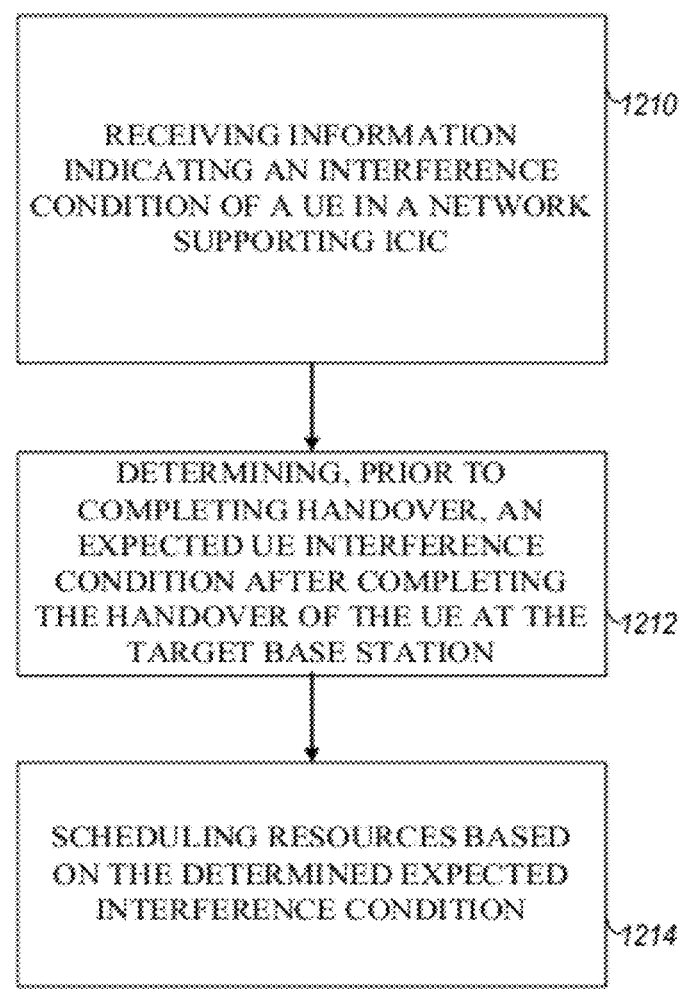
FIG. 12 is a block diagram illustrating a method for determining a UE interference condition after handover.

FIG. 12 illustrates a method for handing over a UE with potential interference.

At block 1210, a base station receives information corresponding to an interference condition at a UE. For example, the target eNodeB 903 receives a handover request message from the source eNodeB 902 when the source eNodeB 902 sends the measurement results of both the target eNodeB 903 and the source eNodeB 902. In another example, only the strongest measurement results are sent. In yet another example, the target eNodeB 903 receives a handover request message from the source eNodeB 902 that includes an explicit indication that the handover is towards a weaker eNodeB. This indication informs the target eNodeB when it is the weaker eNodeB.

At block 1212, the base station determines, prior to completing a handover, an expected UE interference condition after completing the handover of the UE at the target base station. In an example, the target eNodeB may determine that the UE will be under strong interference post-handover when the measurements of the source eNodeB are stronger than the measurements of the target eNodeB.

At block 1214, resources are scheduled based on the determined expected interference conditions at the UE. As discussed above, in one configuration the UE may be scheduled on resources within an existing resource partitioning scheme by the target eNodeB. Alternatively, resources may be negotiated and scheduled between the target eNodeB and one or more interfering eNodeBs based on the expected interference conditions. The UE may be scheduled on resources based on the new resource allocation.

In one configuration, the eNodeB 610 is configured for wireless communication including means for receiving information indicating an interference condition of a UE in a network that supports an inter-cell interference coordination scheme. In one aspect, the receiving means may be the antenna 620, receiver 618, receiver processor 670 controller processor 675, and/or memory 676, configured to perform the functions recited by the receiving means. The eNodeB 610 is also configured to include a means for determining, prior to completing a handover, an expected UE interference condition after completing the handover of the UE at the target base station. In one aspect, the determining means may be the controller 675 and/or memory 676 configured to perform the functions recited by the determining means. In another aspect, the aforementioned means may be any module or any apparatus configured to perform the functions recited by the aforementioned means.

Figure 13:
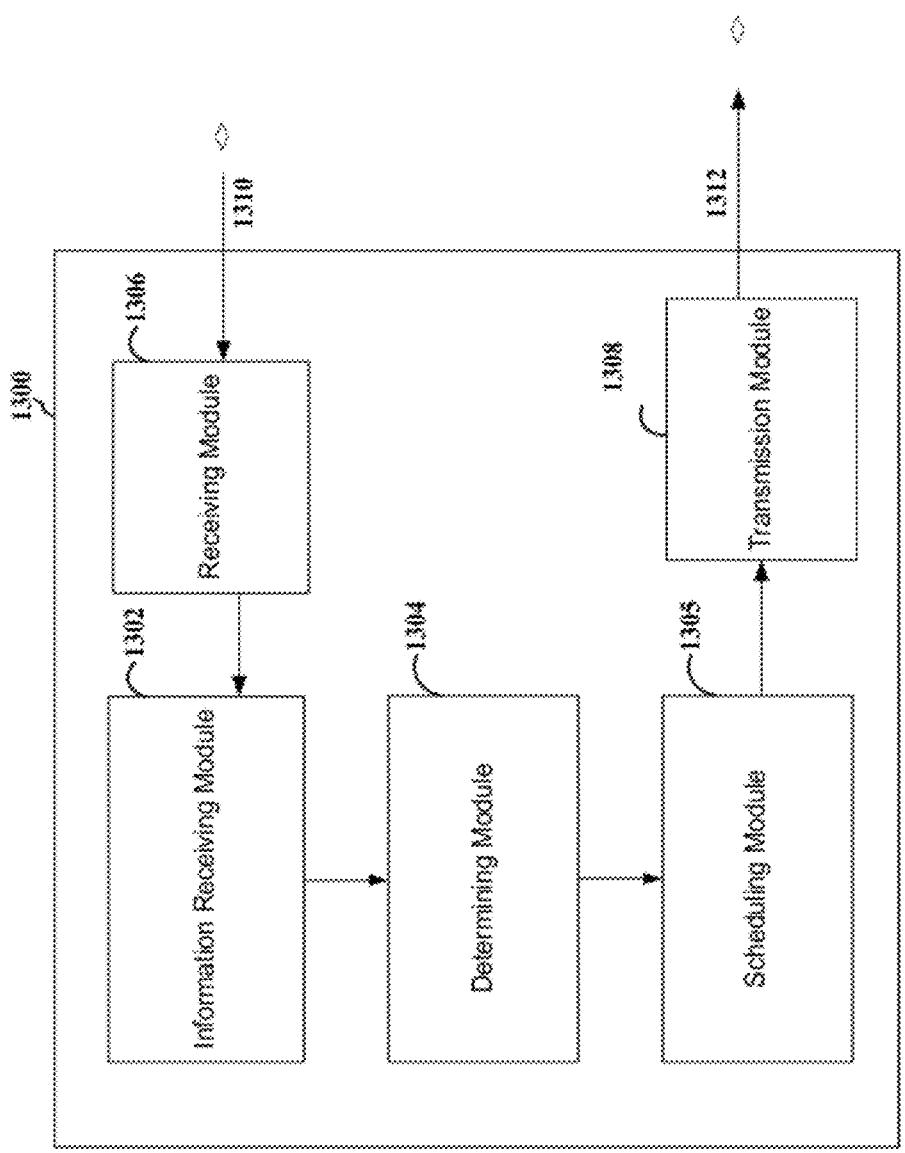
FIG. 13 is a conceptual data flow diagram illustrating the data flow between different modules/means/components in an exemplary apparatus.

FIG. 13 is a conceptual data flow diagram illustrating the data flow between different modules/means/components in an exemplary apparatus 1300. The apparatus 1300 includes an information receiving module 1302, determining module 1304, and scheduling module 1305.

Receiving module 1306 receives a handover request message. The handover request may include information for indicating an interference condition of a UE in a network that supports an inter-cell interference coordination scheme. The information may be included in an information element that already exists in the existing handover messaging structure or may be a new element.

The information receiving module 1302 receives information from the receiving module 1306 indicating an interference condition of a UE in a network that supports an inter-cell interference coordination scheme. The interference conditions may be determined based on, for example, signal measurements from a UE to a target eNodeB, neighboring eNodeB, and/or source eNodeB. According to one aspect, the signal measurements may be determined for a physical downlink channel (e.g., PDSCH) between the UE and an eNodeB. Furthermore, the interference may be determined from a channel quality indicator (CQI), signal to interference noise ratio (SINR), or channel state information (CSI), or any other measurement for channel quality.

The determining module 1304 determines, prior to completing a handover, an expected UE interference condition after completing the handover of the UE at the target base station based on the information identified by information receiving module 1302. The determination is made by determining whether the target eNodeB is stronger in comparison to the interference measurements of other eNodeBs, such as the source eNodeB and/or a neighbor eNodeB. The target eNodeB determines that the UE may expect to experience interference after a handover is completed when the target eNodeB is not the strongest cell. Alternatively, the information in the handover request message may expressly indicate that the target eNodeB is not the strongest cell, and therefore, the UE will expect to experience interference after the handover is complete.

The scheduling module 1305 performs resource allocation and/or negotiation based on the information from determining module 1304. This may include yielding resources to the stronger cell and/or scheduling the UE on resources that do not experience interference. According to one aspect, the UE may be scheduled on resources within an existing resource partitioning scheme by the target eNodeB. Alternatively, resources may be negotiated and scheduled between the target eNodeB and one or more interfering eNodeBs based on the expected interference conditions. The scheduling module 1305 may performs resource allocation and/or negotiation via signals 1312 transmitted via the transmission module 1308.

The apparatus 1300 may include additional modules, such as a transmission module 1308 for transmitting a signal 1312 and a receiving module 1306 for receiving a signal 1310, that performs the methods illustrated in the aforementioned flow charts FIGS. 10-12. As such, each element in the aforementioned flow chart FIGS. 10-12 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 14:
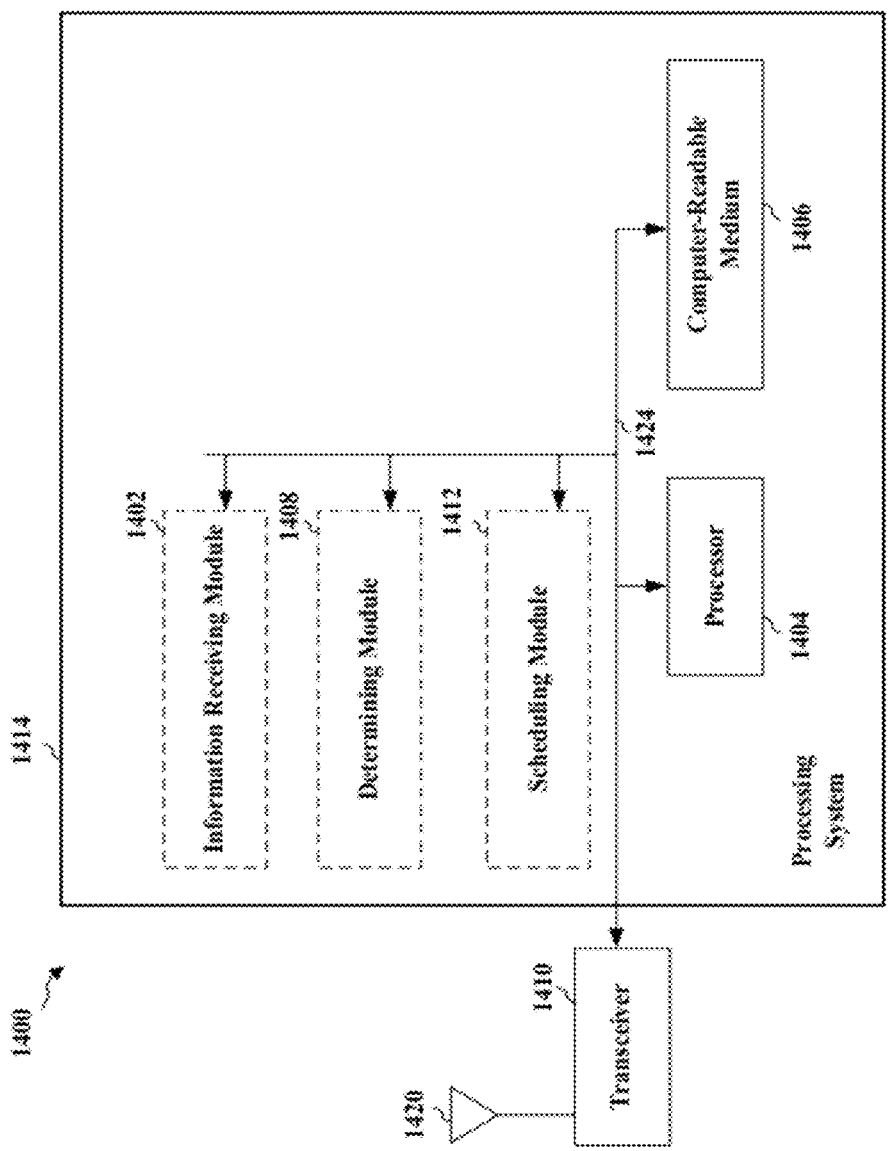
FIG. 14 is a block diagram illustrating exemplary components in an exemplary apparatus.

FIG. 14 is a diagram illustrating an example of a hardware implementation for an apparatus 1400 employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware modules, represented by the processor 1404 the information receiving module 1402, the determining module 1408, the scheduling module 1412, and the computer-readable medium 1406. The bus 1424 may also link various other circuits such as timing sources, peripherals, voltage regulators, and power management circuits, which are well known in the art, and therefore, will not be described any further.

The apparatus includes a processing system 1414 coupled to a transceiver 1410. The transceiver 1410 is coupled to one or more antennas 1420. The transceiver 1410 enables communicating with various other apparatus over a transmission medium. The processing system 1414 includes a processor 1404 coupled to a computer-readable medium 1406. The processor 1404 is responsible for general processing, including the execution of software stored on the computer-readable medium 1406. The software, when executed by the processor 1404, causes the processing system 1414 to perform the various functions described for any particular apparatus. The computer-readable medium 1406 may also be used for storing data that is manipulated by the processor 1404 when executing software.

The processing system includes an information receiving module 1402, a determining module 1408, and a scheduling module 1412. The information receiving module 1402 can receive information indicating an interference condition of a UE in a network that supports an inter-cell interference coordination scheme. The determining module 1408 can determine, prior to completing a handover, an expected UE interference condition after completing the handover of the UE at the target base station. The scheduling module 1412 can schedule and/or negotiate resources of the target eNodeB for the UE based on the expected interference condition determined by the determining module 1408. The modules may be software modules running in the processor 1404, resident/stored in the computer readable medium 1406, one or more hardware modules coupled to the processor 1404, or some combination thereof. The processing system 1414 may be a component of the UE 650 or eNodeB 610 and may include the memory 660, the transmit processor 668, the receive processor 656, the modulators/demodulators 654*a-r*, the antenna 652*a-r*, and/or the controller/processor 659.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium.

For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, the method comprising:
   receiving information indicating an interference condition corresponding to a user equipment (UE) in a network that supports an inter-cell interference coordination scheme; and
   determining, prior to completing a handover, an expected interference condition corresponding to the UE, after completing the handover of the UE to a target base station.

2. The method of claim 1, in which the received information comprises an explicit indication of whether the target base station is a strongest base station.

3. The method of claim 1, further comprising scheduling target base station resources for the UE based on the expected interference condition.

4. The method of claim 3, further comprising initiating transmissions in accordance with the scheduled target base station resources.

5. The method of claim 1, in which the received information comprises measurements of a strongest of at least one of a source base station, the target base station, a neighbor base station, or a combination thereof.

6. The method of claim 1, in which the determining comprises identifying whether the UE is in a cell range expansion (CRE) region.

7. The method of claim 1, in which the received information comprises an explicit indication that a source base station is a strongest base station.

8. The method of claim 1, further comprising negotiating a resource partitioning scheme between the target base station and at least one other base station based on the expected UE interference condition.

9. The method of claim 1, further comprising
   identifying a set of stronger base stations, the stronger base station being at least one base station that is expected to have a stronger measurable signal at the UE than the target base station, after handover, based on the expected UE interference condition; and
   negotiating a resource partitioning scheme between the target base station and at least one base station from the set of stronger base stations.

10. An apparatus for wireless communications, comprising:
    means for receiving information indicating an interference condition corresponding to a user equipment (UE) in a network that supports an inter-cell interference coordination scheme; and
    means for determining, prior to completing a handover, an expected interference condition corresponding to the UE, after completing the handover of the UE to a target base station.

11. The apparatus of claim 10, in which the received information comprises measurements of a source base station and the target base station.

12. The apparatus of claim 10, in which the received information comprises an explicit indication of whether the target base station is a strongest base station.

13. A computer program product for wireless communications, the computer program product comprising:
    a non-transitory computer-readable medium having program code recorded thereon, the program code comprising:
    program code to receive information indicating an interference condition corresponding to a user equipment (UE) in a network that supports an inter-cell interference coordination scheme; and
    program code to determine, prior to completing a handover, an expected interference condition corresponding to the UE, after completing the handover of the UE to a target base station.

14. The computer program product of claim 13, in which the received information comprises measurements of a source base station and the target base station.

15. The computer program product of claim 13, in which the received information comprises an explicit indication of whether the target base station is a strongest base station.

16. An apparatus for wireless communications, comprising:
    a memory; and
    at least one processor coupled to the memory, the at least one processor being configured:
    to receive information indicating an interference condition corresponding to a user equipment (UE) in a network that supports an inter-cell interference coordination scheme; and
    to determine, prior to completing a handover, an expected interference condition corresponding to the UE, after completing the handover of the UE to a target base station.

17. The apparatus of claim 16, in which the received information comprises an explicit indication that a source base station is a strongest base station.

18. The apparatus of claim 16, in which the at least one processor is further configured to schedule target base station resources for the UE based on the expected interference condition.

19. The apparatus of claim 18, in which the at least one processor is further configured to initiate transmissions in accordance with the scheduled target base station resources.

20. The apparatus of claim 16, in which the received information comprises measurements of a strongest of at least one of a source base station, the target base station, a neighbor base station, or a combination thereof.

21. The apparatus of claim 16, in which the at least one processor is further configured to determine by identifying whether the UE is in a cell range expansion (CRE) region.

22. The apparatus of claim 16, in which the received information comprises measurements of a source base station and the target base station.

23. The apparatus of claim 16, in which the at least one processor is further configured to negotiate a resource partitioning scheme between the target base station and at least one other base station based on the expected UE interference condition.

24. The apparatus of claim 16, in which the at least one processor is further configured:
- to identify a set of stronger base stations, the stronger base station being at least one base station that is expected to have a stronger measurable signal at the UE than the target base station, after handover, based on the expected UE interference condition; and
- to negotiate a resource partitioning scheme between the target base station and at least one base station from the set of stronger base stations.

25. The apparatus of claim 16, in which the received information comprises an explicit indication of whether the target base station is a strongest base station.

* * * * *